(12) United States Patent
Navratil

(10) Patent No.: US 7,421,351 B2
(45) Date of Patent: Sep. 2, 2008

(54) MONITORING AND FAULT DETECTION IN DYNAMIC SYSTEMS

(75) Inventor: Roman Navratil, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/644,726

(22) Filed: Dec. 21, 2006

(65) Prior Publication Data

US 2008/0154544 A1 Jun. 26, 2008

(51) Int. Cl.
*G06F 11/00* (2006.01)
*G06F 17/00* (2006.01)

(52) U.S. Cl. .................. 702/58; 702/185; 702/196
(58) Field of Classification Search ............ 702/58, 702/179, 185, 188, 196
See application file for complete search history.

(56) References Cited

U.S. PATENT DOCUMENTS

| | | | |
|---|---|---|---|
| 6,157,894 A * | 12/2000 | Hess et al. | 702/54 |
| 6,256,586 B1 * | 7/2001 | Jacobs | 702/3 |
| 6,368,975 B1 | 4/2002 | Balasubramhanya et al. | 438/706 |
| 6,502,042 B1 * | 12/2002 | Eid et al. | 702/50 |
| 6,521,080 B2 | 2/2003 | Balasubramhanya et al. | 156/345.24 |
| 6,804,600 B1 * | 10/2004 | Uluyol et al. | 701/100 |
| 6,896,763 B2 | 5/2005 | Balasubramhanya et al. | 156/345.24 |
| 6,952,657 B2 | 10/2005 | Jahns et al. | 702/182 |
| 2003/0117317 A1 * | 6/2003 | Vanderwerf et al. | 342/357.02 |
| 2005/0141782 A1 | 6/2005 | Guralnik et al. | 382/276 |
| 2006/0058898 A1 * | 3/2006 | Emigholz et al. | 700/29 |
| 2006/0259163 A1 * | 11/2006 | Hsiung et al. | 700/30 |

OTHER PUBLICATIONS

Demeure et al., "The Euclid algorithm and the fast computation of cross-covariance and autocovariance sequences", Apr. 1989. IEEE, IEEE Transactions on Acoustics, Speech, and Signal Processing, vol. 37, issue 4, pp. 545-552.*

Mossberg, "Identification of continuous-time ARX models using sample cross-covariances", Jun. 8-10, 2005, IEEE, Proceedings of the 2005 American Control Conference, 2005, vol. 7, pp. 4766-4771.*

Ramos et al., "A Vectorized Principal Component Approach for Solving the Data Registration Problem", Dec. 13-15, 2006, pp. 1297-1302.*

Combination of Multivariate Statistical Process Control and Classification Tool for Situation Assessment Applied to a Sequencing Batch Reactor Wastewater Treatment; M.L. Ruiz, J. Colomer, M. Rubio, J. Melendez; Control Engineering and Intelligent Systems; University of Girona, Spain.

(Continued)

*Primary Examiner*—Hal D Wachsman
(74) *Attorney, Agent, or Firm*—Kris T. Fredrick

(57) ABSTRACT

A system and method for monitoring and fault detection in dynamic systems. A "cross-covariance" matrix is used to construct and implement a principle component analysis (PCA) model and/or partial least squares (PLS) model. This system is further utilized for monitoring and detecting faults in a dynamic system. Time series information is synchronized, with respect to a set of training data. Based on historical data, consistency of correlations between variables can be checked with respect to a given time stamp.

19 Claims, 2 Drawing Sheets

OTHER PUBLICATIONS

Process Analytical Technology; M.L. Balboni; KMI Parexel; Pharmaceutical Technology, Oct. 2003.

Adaptive Multiscale Principal Component Analysis for On-line Monitoring of a Sequencing Batch Reactor; D.S. Lee, J.M. Park, P.A. Vanrolleghem; Journal of Biotechnology 116 (2005) 195-210.

Adaptive Consensus Principal Component Analysis for On-Line Batch Process Monitoring; D.S. Lee, P.A. Vanrolleghem; Biomath, Ghent University, Coupure Links 653, B-9000 Gent. Belgium.

A Tutorial on Principal Components Analysis; L.I. Smith, Feb. 26, 2002.

* cited by examiner

MONITORING AND FAULT DETECTION IN DYNAMIC SYSTEMS

TECHNICAL FIELD

Embodiments are generally related to data-processing systems and methods. Embodiments are also related to techniques for monitoring a continuous manufacturing system. Embodiments are additionally related to systems and methods for monitoring and detecting faults in dynamic systems.

BACKGROUND OF THE INVENTION

Traditional fault detection methods use model-based or knowledge-based approaches that require considerable effort to design and build, and incorporate analytical models or knowledge-based systems. In order to address the difficulties that lie in model-based or knowledge-based methods, model-free statistical process monitoring (SPM) techniques have been developed, which require only a good historical data set of normal operations. In current manufacturing and industrial processes, massive amounts of trace or machine data are generated and recorded. Because of the high dimensionality of the data, both principal component analysis (PCA) and partial least squares (PLS) based multivariate statistical fault detection techniques are often used to monitor continuous processes.

In one prior art approach, multivariate statistical process control (MSPC) techniques for process monitoring and fault diagnosis based on principal-component analysis (PCA) models of multi-scale data have been implemented. Process measurements, representing the cumulative effects of many underlying process phenomena, can be decomposed by applying multi-resolution analysis (MRA) by wavelet transformations. The decomposed process measurements are rearranged according to their scales and PCA is applied to the multi-scale data to capture process variable correlations occurring at different scales. Selecting an ortho-normal mother wavelet allows each principal component to be implemented as a function of the process variables at only one scale level. Once a fault is detected, the contributions of the variations at each scale to the fault can be computed. These scale contributions can be very helpful in isolating faults that occur mainly at a single scale. For those scales having large contributions to the fault, however, one can further compute the variable contributions to those scales.

Other prior art techniques involve monitoring a process through the use of PCA only. Correlated attributes can be measured for the process to be monitored (the production process). A PCA algorithm can then be performed on the measured correlated attributes so as to generate one or more production principal components, which can then be compared to a principal component associated with a calibration process (i.e., a calibration principal component). The calibration principal component is obtained by measuring correlated attributes of a calibration process and by performing a PCA on the measured correlated attributes so as to generate one or more principal components. A principal component having a feature indicative of a desired process state, process event and/or chamber state is then identified and designated as the calibration principal component.

Abnormal situations commonly result from the failure of field devices such as instrumentation, control valves, and pumps or some form of process disturbance that causes the plant operations to deviate from the normal operating state. In particular, the undetected failure of key instrumentation and other devices, which are part of the process control system, can cause the control system to drive the process into an undesirable and dangerous state. Early detection of these failures enables the operation team to intervene before the control system escalates the failure into a more severe incident.

Thousands of process and equipment measurements are gathered by modern digital process control systems and deployed in refineries and chemical plants. Several years of such data can be stored as histories in databases for analysis and reporting. These databases can then be mined for the data patterns that occur during normal operation and those patterns can be used to determine the abnormal behavior of the process.

The aforementioned prior art techniques reply upon the use of a covariance matrix to construct a model of variable relationships in PCA and also use static methods that compare the consistency of correlations between variables for a given time stamp. There is a need, however, for efficiently and effectively monitoring process dynamics in an industrial or manufacturing setting. Additionally, because time-series synchronization occurs in the context of a data pre-processing operation, the use of a snapshot monitoring method does not take into account the synchronization of time-series data corresponding to individual tags. Moreover, delayed time stamps used as inputs to PCA modules are not sufficient for clearly capturing the process dynamics.

Based on the foregoing it is believed that a need exists for an improved technique for consistently monitoring and detecting faults in manufacturing and industrial processes. Additionally, a need exists for comparing the consistency of process dynamics (e.g., changes in time) in order to improve the performance of system monitoring and preventing incidents in manufacturing settings.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing system and method.

It is another aspect of the present invention to provide a technique for monitoring a continuous manufacturing process.

It is a further aspect of the present invention to provide for an improved fault detection and monitoring method and system.

The aforementioned aspects and other objectives and advantages can now be achieved as described herein. A computer implemented method and system for fault detection and monitoring of a dynamic system is disclosed. In general, a cross-covariance matrix comprising data indicative of a behavior of a dynamic system can be developed. Thereafter, the cross-covariance matrix can be utilized to monitor and detect faults in the dynamic system. In order to develop such a cross-covariance matrix, a set of training data indicative of a normal process behavior of the dynamic system is obtained. A matrix can be constructed, which is associated with a cross-correlation chart utilizing the set of training set. Thereafter, a plurality of lags can be calculated for a plurality of pair of tag variables by locating a maximum of an absolute value of a cross-correlation function in the cross-correlation chart. A matrix is then constructed of the plurality of lags, wherein such a matrix tracks data between each pair of tag variables among the plurality of pair of tag variables. Finally, the cross-covariance matrix is created utilizing the matrix based on the plurality of lags. The cross-covariance is preferably implemented in the context of a covariance matrix in a PCA or a PLS model. This method is further denoted as Temporal PCA, abbreviated as T-PCA.

PCA/PLS multivariate technologies are used in snapshot monitoring mode. Based on historical data, a consistency of correlations between variables can be checked for a given time stamp. Traditional PCA/PLS is based on evaluation of covariance matrix Eigen values. In the present invention, a "cross-covariance" matrix can be used instead of a covariance matrix. The method and system monitors how consistently the time series are synchronized with respect to the training set. The system uses Temporal PCA (T-PCA) for clearly monitoring changes in tags (time series) synchronization even when the temporal behaviors of dynamic system are not clear.

The system constructs a matrix of cross-correlation charts for one pair of tags using available training set data, constructs a matrix of lags between all variable pairs and calculates lag for one pair of tag variable by locating maximum of absolute value of cross-correlation function in chart. Then, the system calculates "cross-covariance" matrix using the matrix of lags and uses the calculated "cross-covariance" matrix in PCA instead of covariance matrix. The present invention can be more easily implemented/re-turned and configured in a more robust manner than prior art systems. Further, the present invention is more systematic and does not require manual data pre-processing steps.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
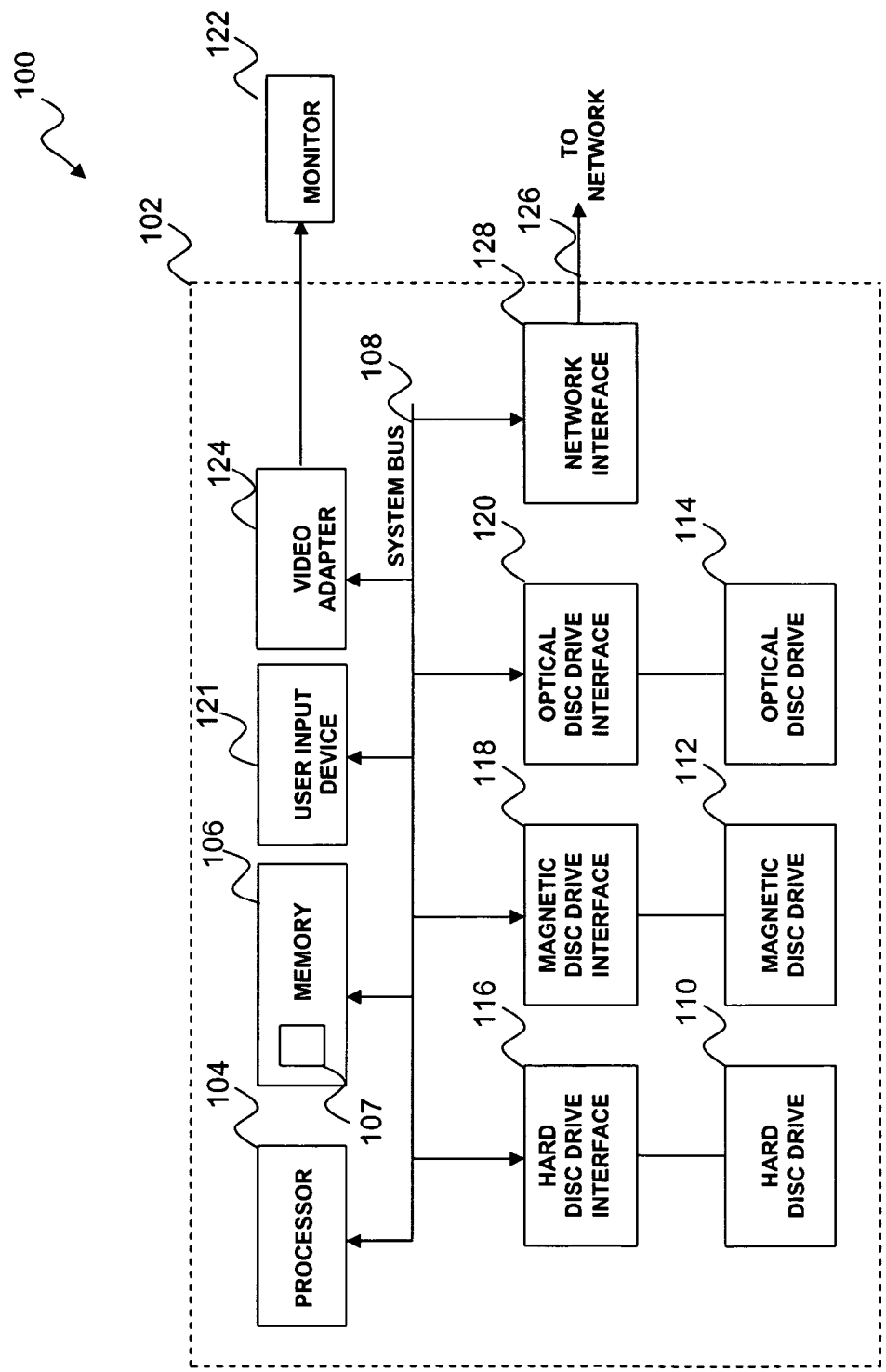
FIG. 1 illustrates a block diagram of a data-processing system, which can be utilized to implement a preferred embodiment.

FIG. 1 illustrates a block diagram of a data-processing apparatus 100, which can be utilized to implement a preferred embodiment. Data-processing apparatus 100 can implement the present invention as described in greater detail herein. It can be appreciated that data-processing apparatus 100 represents merely one example of a system that can be utilized to implement the present invention described herein. System 100 is provided for general illustrative purposes only. Other types of data-processing systems can also be utilized to implement the present invention. Data-processing apparatus 100 can be configured to include a general purpose computing device, such as a computer 102. The computer 102 includes a processing unit 104, a memory 106, and a system bus 108 that operatively couples the various system components to the processing unit 104. One or more processing units 104 operate as either a single central processing unit (CPU) or a parallel processing environment.

The data-processing apparatus 100 further includes one or more data storage devices for storing and reading program and other data. Examples of such data storage devices include a hard disk drive 110 for reading from and writing to a hard disk (not shown), a magnetic disk drive 112 for reading from or writing to a removable magnetic disk (not shown), and an optical disc drive 114 for reading from or writing to a removable optical disc (not shown), such as a CD-ROM or other optical medium. A monitor 122 is connected to the system bus 108 through an adapter 124 or other interface. Additionally, the data-processing apparatus 100 can include other peripheral output devices (not shown), such as speakers and printers. A user input device 121 such as a mouse and/or keyboard and/or other user input device is also generally connected to the system bus 108.

The hard disk drive 110, magnetic disk drive 112, and optical disc drive 114 are connected to the system bus 108 by a hard disk drive interface 116, a magnetic disk drive interface 118, and an optical disc drive interface 120, respectively. These drives and their associated computer-readable media provide nonvolatile storage of computer-readable instructions, data structures, program modules, and other data for use by the data-processing apparatus 100. Note that such computer-readable instructions, data structures, program modules, and other data can be implemented as a module 107. Module 107 can be utilized to implement the method 200 depicted and described herein with respect to FIG. 2.

Note that the embodiments disclosed herein can be implemented in the context of a host operating system and one or more module(s) 107. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 100, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules, such as, for example, module 107, can be stored or encoded in a machine readable medium such as the hard disk drive 110, the, magnetic disk drive 114, the optical disc drive 114, ROM, RAM, etc or an electrical signal such as an electronic data stream received through a communications channel. These program modules can include an operating system, one or more application programs, other program modules, and program data.

The data-processing apparatus 100 can operate in a networked environment using logical connections to one or more remote computers (not shown). These logical connections are implemented using a communication device coupled to or integral with the data-processing apparatus 100. The data sequence to be analyzed can reside on a remote computer in the networked environment. The remote computer can be another computer, a server, a router, a network PC, a client, or a peer device or other common network node. FIG. 1 depicts the logical connection as a network connection 126 interfacing with the data-processing apparatus 100 through a network interface 128. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

The method and system described herein relies on the use of PCA, which is employed to monitor and detect faults in manufacturing and industrial processes. Many process and equipment measurements can be gathered via digital process control devices deployed in manufacturing systems. Collected data can be "historized" in databases for analysis and reporting. Such databases can be mined for data patterns that occur during normal operations. The patterns can then be used to determine faults when a process is behaving abnormally. The system uses data indicative of normal process behavior as training set data for monitoring how consistently time series data are synchronized with respect to the training set data. The method and system disclosed herein also uses Temporal PCA (T-PCA) techniques for monitoring the temporal behavior of a system and in particular temporal aspect of Early Event Detection (EED).

Fault detection for cases, where changes in variable values are not propagating on the technological equipment consistently with historical data (nominal model) is addressed. For example a feed increase is not propagated over the distillation column correctly, as the feed starts being accumulated in the column. Further a feed can be delayed in the distillation column too long (compared to the delays included in training set) where a Q statistic will get over the threshold. The same happens when the feed goes through the column too quickly. In another example temperature increase at the bottom of distillation column appears at the column top more quickly than in the historical data. The system monitors consistency of time dependent changes in the above mentioned process.

Figure 2:
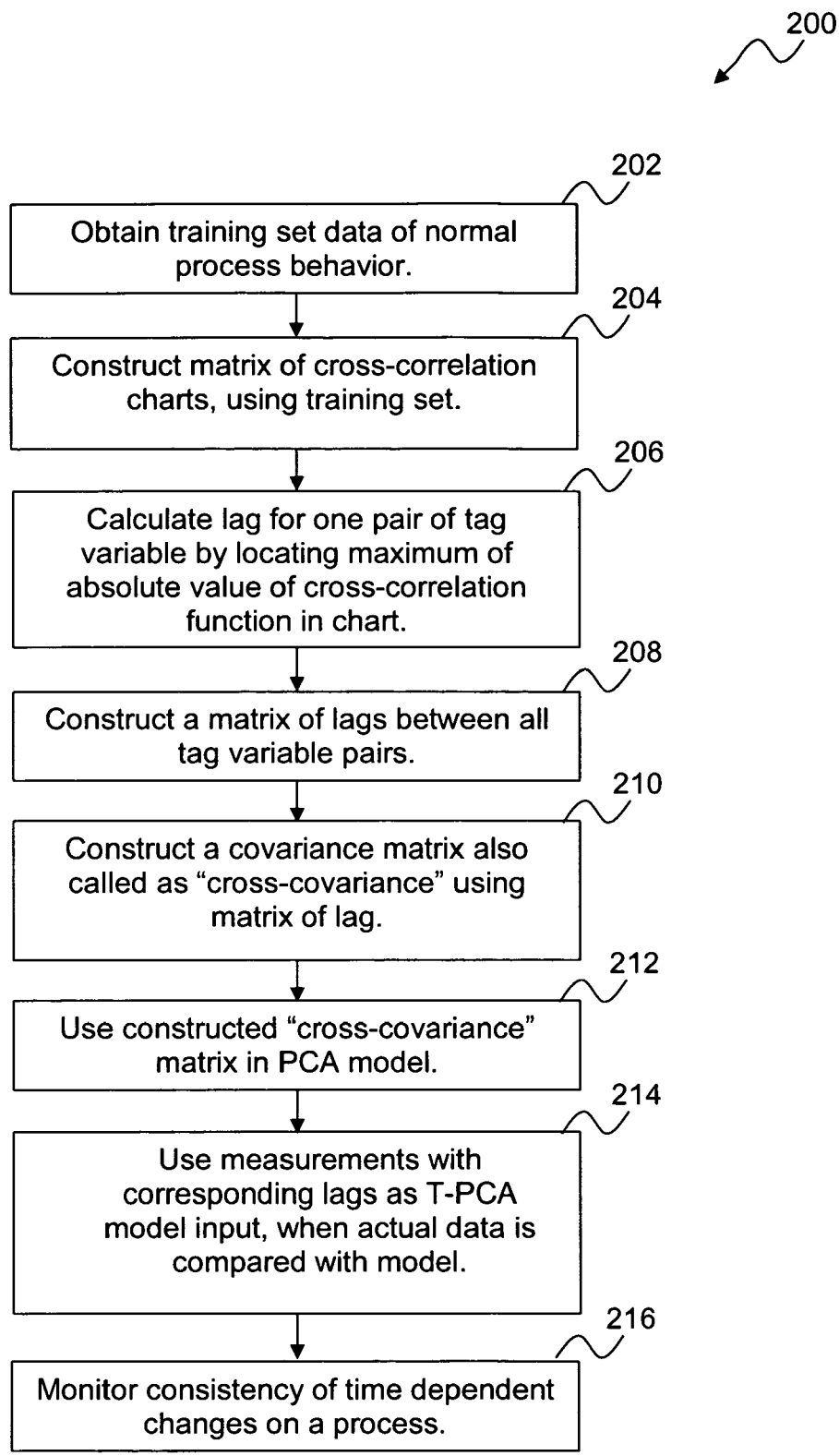
FIG. 2 illustrates a high level flow chart of operations illustrating logical operational steps for monitoring and fault detection in dynamic systems, in accordance with a preferred embodiment.

FIG. 2 illustrates a high level flow chart of operations illustrating logical operational steps of a method 200 for the fault detection and monitoring of a dynamic system, in accordance with a preferred embodiment. Note that the data-processing apparatus 100 and module 107 can be operable in combination with one another to perform the method 200. Thus, module 107 can be implemented as a software module that implements the method 200 in accordance with a data-processing apparatus, such as, for example, data-processing apparatus 100 of FIG. 1. As indicated at block 202, a training set data indicative of normal process behavior can be obtained. As indicated thereafter at block 204, a matrix of cross-correlation charts can be constructed using the training set obtained as indicated at block 202. A lag for one pair of lag variable can be calculated by locating a maximum of absolute value of cross-correlation function as depicted at block 206. The matrix of lags can be transformed to a vector of lags, each lag having a specific lag defined with respect to a reference time. A matrix of lags between all tag variable pairs can be constructed as indicated at block 208. Next, as described at block 210, a covariance matrix (also referred to as "cross covariance") can be calculated utilizing the matrix of lag. The "cross-covariance" term does not possess a clear statistical definition and can thus be changed with respect to other statistical terms (e.g., covariance). For this reason, the "cross-covariance" denotes the covariance between two time series that are mutually shifted. A "cross-covariance" matrix element for a pair of variables x, y can be calculated as depicted in equation (1) given below:

$$\text{"Cross-covariance"}: \frac{\sum_{i=1}^{n}(x_i - \bar{x})(y_{i-lag(y)} - \bar{y})}{n-1} \quad (1)$$

In equation (1), the variable x is at reference time without having a time lag and the variable y does possess a time lag. As depicted at block 212, a "cross-covariance" matrix can be used in PCA, instead of a covariance matrix. When actual data is compared with the model, the measurements using the corresponding lags determined can be used as model inputs, as indicated at block 214. Finally, the consistency of time dependent changes with respect to a particular process can be monitored, as described at block 216.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented method for fault detection and monitoring of a dynamic system, comprising:
    obtaining a set of training data indicative of a normal process behavior of said dynamic system;
    constructing a matrix associated with a cross-correlation chart utilizing said set of training data;
    calculating a plurality of lass for a plurality of pair of tag variables by locating a maximum of an absolute value of a cross-correlation function in said cross-correlation chart;
    constructing a matrix of said plurality of lass that tracks data between each pair of tag variables among said plurality of pair of tag variables;
    developing a cross-covariance matrix utilizing said matrix of said plurality of lags comprising data indicative of a behavior of said dynamic system; and
    analyzing said cross-covariance matrix to monitor and detect faults in said dynamic system.

2. The computer implemented method of claim 1 further comprising:
    utilizing said cross-covariance matrix in a PCA (Principal Component Analysis) model.

3. The method of claim 2 further comprising:
    comparing actual data generated by said dynamic system with said PCA model using said plurality of lags in the context of a T-PCA (Temporal-PCA) model input.

4. The computer implemented method of claim 3 further comprising processing said PCA model in parallel with said T-PCA model.

5. The computer implemented method of claim 1 further comprising:
    monitoring a consistency of time dependent changes associated with said dynamic system in order to monitor and detect faults in said dynamic system.

6. The computer implemented method of claim 1 further comprising:
    transforming said plurality of lags into a plurality of vectors of lags, wherein each of said plurality of lags possesses a specific lag defined with respect to a reference time.

7. The computer implemented method of claim 1 further comprising:
calculating said cross-covariance matrix according to an equation as follows:

$$\text{"Cross-covariance"}: \frac{\sum_{i=1}^{n}(x_i - \bar{x})(y_{i-lag(y)} - \bar{y})}{n-1}$$

8. A computer implemented method for fault detection and monitoring of a dynamic system, comprising:
obtaining a set of training data indicative of a normal process behavior of said dynamic system;
constructing a matrix associated with a cross-correlation chart utilizing said set of training data;
calculating a plurality of lass for a plurality of pair of tag variables by locating a maximum of an absolute value of a cross-correlation function in said cross-correlation chart;
constructing a matrix of said plurality of lass that tracks data between each pair of tag variables among said plurality of pair of tag variables;
developing a cross-covariance matrix utilizing said matrix of said plurality of lags comprising data indicative of a behavior of said dynamic system;
utilizing said cross-covariance matrix in a PCA model; and
analyzing said cross-covariance matrix in said PCA model to monitor and detect faults in said dynamic system.

9. The computer implemented method of claim 8 further comprising:
comparing actual data generated by said dynamic system with said PCA model using said plurality of lags in the context of a T-PCA (Temporal-PCA) model input.

10. The computer implemented method of claim 8 further comprising:
monitoring a consistency of time dependent changes associated with said dynamic system in order to monitor and detect faults in said dynamic system.

11. The computer implemented method of claim 8 further comprising:
transforming said plurality of lags into a plurality of vectors of lags, wherein each of said plurality of lags possesses a specific lag defined with respect to a reference time.

12. The computer implemented method of claim 8 further comprising:
calculating said cross-covariance matrix according to an equation as follows:

$$\text{"Cross-covariance"}: \frac{\sum_{i=1}^{n}(x_i - \bar{x})(y_{i-lag(y)} - \bar{y})}{n-1}$$

13. A system for fault detection and monitoring of a dynamic system, comprising:
a data-processing apparatus;
a module executed by said data-processing apparatus, said module and said data-processing apparatus being operable in combination with one another to:
obtain a set of training data indicative of a normal process behavior of said dynamic system;
construct a matrix associated with a cross-correlation chart utilizing said set of training set;
calculate a plurality of lass for a plurality of pair of tag variables by locating a maximum of an absolute value of a cross-correlation function in said cross-correlation chart;
construct a matrix of said plurality of lass that tracks data between each pair of tag variables among said plurality of pair of tag variables;
develop a cross-covariance matrix utilizing said matrix of said plurality of lass comprising data indicative of a behavior of said dynamic system; and
analyze said cross-covariance matrix to monitor and detect faults in said dynamic system.

14. The system of claim 13 wherein said data-processing apparatus and said module are further operable in combination with one another to utilize said cross-covariance matrix in a PCA (Principal Component Analysis) model.

15. The system of claim 14 wherein said data-processing apparatus and said module are further operable in combination with one another to compare actual data generated by said dynamic system with said PCA model using said plurality of lags in the context of a T-PCA (Temporal-PCA) model input.

16. The system of claim 15 further comprising wherein said data-processing apparatus and said module are further operable in combination with one another to process said PCA model in parallel with said T-PCA model.

17. The system of claim 13 wherein said data-processing apparatus and said module are further operable in combination with one another to monitor a consistency of time dependent changes associated with said dynamic system in order to monitor and detect faults in said dynamic system.

18. The system of claim 13 wherein said data-processing apparatus and said module are further operable in combination with one another to transform said plurality of lags into a plurality of vectors of lags, wherein each of said plurality of lags possesses a specific lag defined with respect to a reference time.

19. The system of claim 13 wherein said module and said data-processing apparatus being further operable in combination with one another to:
calculate said cross-covariance matrix according to an equation as follows:

$$\text{"Cross-covariance"}: \frac{\sum_{i=1}^{n}(x_i - \bar{x})(y_{i-lag(y)} - \bar{y})}{n-1}$$

\* \* \* \* \*